(12) United States Patent
Sutter et al.

(10) Patent No.: US 11,880,822 B2
(45) Date of Patent: *Jan. 23, 2024

(54) SYSTEM AND METHOD FOR ACTIVATING A PHYSICAL TOKEN IN AUGMENTED REALITY

(71) Applicant: The Toronto-Dominion Bank, Toronto (CA)

(72) Inventors: Levi Sutter, Westampton, NJ (US); Miguel Navarro, Ewing, NJ (US)

(73) Assignee: The Toronto-Dominion Bank, Toronto (CA)

( * ) Notice: Subject to any disclaimer, the term of this patent is extended or adjusted under 35 U.S.C. 154(b) by 100 days.

This patent is subject to a terminal disclaimer.

(21) Appl. No.: 17/136,257

(22) Filed: Dec. 29, 2020

(65) Prior Publication Data

US 2021/0117958 A1 Apr. 22, 2021

Related U.S. Application Data

(63) Continuation of application No. 16/145,498, filed on Sep. 28, 2018, now Pat. No. 10,909,526.

(51) Int. Cl.
*G06Q 20/34* (2012.01)
*G06Q 20/32* (2012.01)
*G06T 19/00* (2011.01)

(52) U.S. Cl.
CPC ......... *G06Q 20/354* (2013.01); *G06Q 20/322* (2013.01); *G06Q 20/3255* (2013.01); *G06T 19/006* (2013.01)

(58) Field of Classification Search
None
See application file for complete search history.

(56) References Cited

U.S. PATENT DOCUMENTS 9,082,245 B2 7/2015 Griggs
9,477,852 B1 10/2016 Neale et al.
(Continued)

FOREIGN PATENT DOCUMENTS

| WO | 2015114460 A2 | 8/2015 |
| WO | 2016033165 A1 | 3/2016 |
| WO | 2017055373 A1 | 4/2017 |

OTHER PUBLICATIONS

Brackman: "Citi Mobile App adds streamlined card activation to growing list of new features", https://www.creditcards.com/credit-card-news/citi-mobile-app-adds-streamlined-card-activation-to-growing-list-of-new-features.php; dated Jan. 27, 2017.
(Continued)

*Primary Examiner* — Joseph W. King
*Assistant Examiner* — Liz P Nguyen
(74) *Attorney, Agent, or Firm* — Rowand LLP (57) ABSTRACT

A computer-implemented method allows initiating activation in augmented reality of an un-activated physical token. The method includes displaying an augmented reality version of an environment including the physical token. Displaying the augmented reality version of the environment includes capturing an image of a portion of the environment including the physical token; presenting a display of augmented reality corresponding to the portion of the environment by compositing the image of the portion of the environment with a graphical, interactive user interface control, the user interface control positioned in a defined position in augmented reality relative to the physical token. The method further includes, responsive to receipt of input corresponding to an interaction with the user interface control, initiating activation of the physical token. Related computer systems and computer-readable media are also disclosed.

20 Claims, 8 Drawing Sheets

(56) References Cited

U.S. PATENT DOCUMENTS

| | | | |
|---|---|---|---|
| 9,805,362 B2 | 10/2017 | Kobylkin et al. | |
| 2012/0316992 A1* | 12/2012 | Oborne | G06Q 20/386 |
| | | | 705/26.41 |
| 2014/0076965 A1* | 3/2014 | Becorest | G06Q 20/342 |
| | | | 235/375 |
| 2014/0195325 A1* | 7/2014 | Denevi | G06Q 20/24 |
| | | | 705/14.34 |
| 2015/0170137 A1 | 6/2015 | Balbus | |
| 2015/0302396 A1* | 10/2015 | Jeon | G06Q 20/322 |
| | | | 705/41 |
| 2016/0063484 A1* | 3/2016 | Carpenter | G06Q 20/3263 |
| | | | 705/41 |
| 2016/0071101 A1 | 3/2016 | Winarski | |
| 2016/0364938 A1 | 12/2016 | Miranda et al. | |
| 2017/0124554 A1 | 5/2017 | Sloan | |
| 2017/0161978 A1* | 6/2017 | Wishne | G06Q 20/352 |
| 2017/0289127 A1 | 10/2017 | Hendrick | |
| 2018/0117944 A1 | 5/2018 | Lee | |
| 2018/0232756 A1* | 8/2018 | Greene | G06Q 30/0231 |

OTHER PUBLICATIONS

CIPO, Examiner's Report relating to CA application No. 3,021,614 dated Feb. 2, 2022.

* cited by examiner

SYSTEM AND METHOD FOR ACTIVATING A PHYSICAL TOKEN IN AUGMENTED REALITY

CROSS-REFERENCE TO RELATED APPLICATION

This application is a continuation of U.S. patent application Ser. No. 16/145,498 entitled "System and Method for Activating a Physical Token in Augmented Reality", filed on Sep. 28, 2018, the contents of which are herein incorporated by reference in their entirety.

TECHNICAL FIELD

The present application relates to augmented reality and, more particularly, to the use of augmented reality in initiating activation of physical tokens as may require activation before use.

BACKGROUND

Physical tokens are provided to and carried by individuals for a variety of purposes. For example, electronic keys may be used to access secure facilities. In another example, tokens such as, for example, credit or debit cards, may be used in making electronic payments.

In some cases, activation of physical tokens may be required before first use for a variety of reasons. For example, physical tokens are often sent to individuals using conveyances such as, for example, postal or courier services where they could be vulnerable to interception during transit or after delivery. In order to mitigate the risk of token interception and misuse, activation of physical tokens may be a pre-requisite to their use. It may be that without activation a physical token cannot be used for its intended purpose. For example, backend computer systems providing or enabling services in association with such tokens may detect that a physical token has not yet been activated and may block it from being used until it has been activated.

Activation of tokens has traditionally required a user to place a telephone call to a call centre. A user may speak with a representative from the call centre who is able to activate the token. The user may have to read an identification number from the physical token and may be required to answer one or more security questions in order to effect activation.

More recently, some activation systems have employed interactive voice response (IVR) systems allowing all or a portion of the activation calls to be automated. For example, a user may use a Touch-Tone™ telephone in order to enter the aforementioned identifying number. The user may also use their telephone keypad to provide identifying information such as, for example, their date of birth or a portion of their Social Security Number (SSN), in order to authenticate themselves as the proper holder of the physical token.

Even more recently, Internet-based activation has allowed activation without the use of a telephone. Instead, a user may visit a website and fill out a form keying information associated with the card. The user may then be faced with one or more challenge questions to which they must respond with answers in order to authenticate themselves as the proper holder of the physical token. Such challenge questions may, for example, seek identifying information of the sort mentioned above with respect to IVR-based activation.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

According to the subject matter of the present application, there may be provided a computing device. The computing device may include a processor, an image capture module, a display module, and a memory module. The image capture module, the display module, and the memory module may be coupled to the processor. The memory module may store instructions that, when executed by the processor, cause the computing device to: display, using the display module, an augmented reality version of an environment including an un-activated physical token. Displaying the augmented reality version of the environment may include capturing, using the image capture module, an image of a portion of the environment including the physical token and presenting, using the display module, a display of augmented reality corresponding to the portion of the environment. The display of augmented reality may be presented by compositing the image of the portion of the environment with a graphical, interactive user interface control, the user interface control positioned in a defined position in augmented reality relative to the physical token. It may be that, responsive to receipt of input corresponding to an interaction with the user interface control, activation of the physical token is initiated.

In this way, activation of a physical token may be initiated in augmented reality. Conveniently, activating a physical token in augmented reality may be more efficient than initiating activation in other manners such as, for example, by telephone interactive voice response. For example, a user may avoid having to key identifying information from the physical token. Additionally or alternatively, by providing a user interface control visually overlaid on the physical token requiring activation, activation may be made more intuitive than in earlier systems such as might have, for example, required a user to seek out special information such as, for example, a telephone number or website address in order to initiate activation.

In some implementations, receiving input corresponding to the interaction with the user interface control may include detecting, using the image capture module, an interaction with the environment, the defined position in augmented reality corresponding to a location of the interaction in the environment.

In some implementations, it may be that the display module is a touch sensitive display module. It may be that receiving input corresponding to the interaction with the user interface control includes receiving touch input, via the display module, corresponding to an interaction with the user interface control as presented.

In some implementations, displaying the augmented reality version of the environment further may include identifying, in the image, one or more visual elements of the physical token. It may be that the defined position in the image of the portion of the environment is determined based on positions of the one or more visual elements. The one or more visual elements of the physical token may, for example, include a logo displayed on the physical token. It may be that at least one of the one or more visual elements corresponds to a removable sticker applied to the physical token.

In some implementations, the computing device may include a communications module coupled to the processor and initiating activation of the physical token may include extracting a value, visible on the physical token, identifying the physical token from the image of the physical token; and sending, to a server computing device via a network using the communications module, a request to activate the physical token, the request including an indication of the value identifying the physical token. It may be that the request further includes an indication of a value associated with the computing device. Activation of the physical token may include determining that the value associated with the computing device matches a value associated with an account corresponding to the physical token. Activation of the physical token may include determining that the value associated with the computing device matches a value associated with an account corresponding to the physical token. The value associated with the computing device may be a telephone number. The instructions, when executed by the processor, further cause the computing device to receive a short message service (SMS) communication that was sent to the telephone number, the SMS communication including an authentication code, wherein the request to activate the physical token includes an indication of the authentication code. In some implementations, it may be that the instructions, when executed by the processor, further cause the computing device to: receive input corresponding to authentication information; and authenticate with the server computing device based on the input.

In some implementations, it may be that the instructions, when executed by the processor, further cause the computing device to determine, prior to presenting the display of augmented reality corresponding to the portion of the environment, that the physical token is not activated.

It may be that the physical token is or includes a payment card. For example, the physical token may be or may include a credit card or a debit card.

According to the subject matter of the present application, there may be provided a computer-implemented method including: displaying an augmented reality version of an environment including an un-activated physical token, wherein displaying the augmented reality version of the environment includes: capturing an image of a portion of the environment including the physical token; and presenting a display of augmented reality corresponding to the portion of the environment by compositing the image of the portion of the environment with a graphical, interactive user interface control, the user interface control positioned in a defined position in augmented reality relative to the physical token; and responsive to receipt of input corresponding to an interaction with the user interface control, initiating activation of the physical token.

According to the subject matter of the present application, there may be provided a non-transitory computer-readable storage medium storing instructions that, when executed by a processor of a computing device, cause the computing device to: display an augmented reality version of an environment including an un-activated physical token, wherein displaying the augmented reality version of the environment includes: capturing an image of a portion of the environment including the physical token; and presenting a display of augmented reality corresponding to the portion of the environment by compositing the image of the portion of the environment with a graphical, interactive user interface control, the user interface control positioned in a defined position in augmented reality relative to the physical token; and responsive to receipt of input corresponding to an interaction with the user interface control, initiate activation of the physical token.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1:
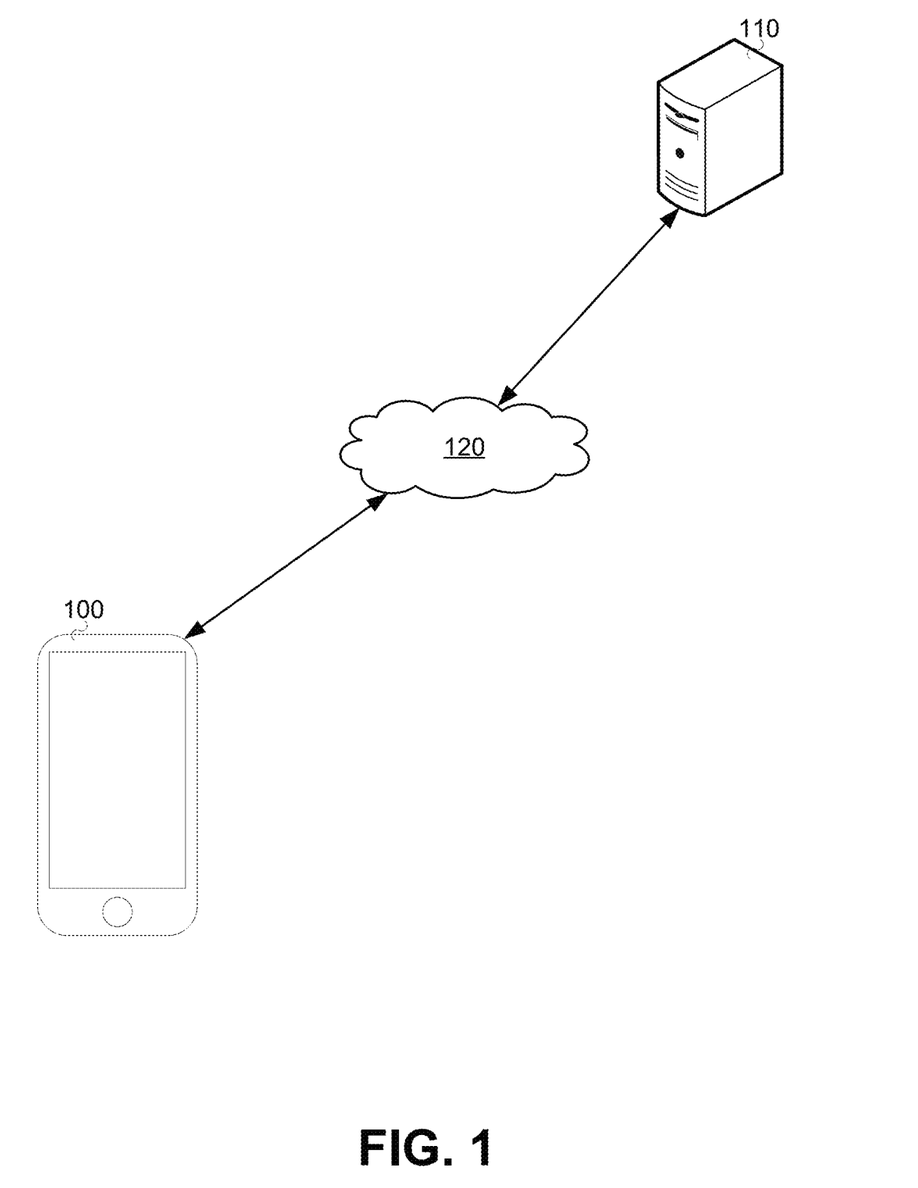
FIG. 1 is a schematic operation diagram illustrating an operating environment of an example embodiment.

FIG. 1 is a schematic operation diagram illustrating an operating environment of an example embodiment.

As illustrated, a mobile device 100 and a server computing device 110 communicate via a network 120.

The mobile device 100 and the server computing device 110 may be in geographically disparate locations. Put differently, the mobile device 100 may be remote from the server computing device 110.

The mobile device 100 and the server computing device 110 are computer systems.

As further described below, the mobile device 100 is adapted to present augmented reality environments, a specialized form of virtual reality in which graphic objects in a virtual-reality environment are related to objects in a real-world scene or environment and are presented in real-time as that real-world environment is captured using an image capture module.

As further described below, the server computing device 110 is adapted to provide services related to the activation of physical tokens.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

As further explained below, the mobile device 100 communicates with the server computing device 110 via the network 120 in order to activate a physical token requiring activation to be initiated in augmented reality.

Figure 2A:
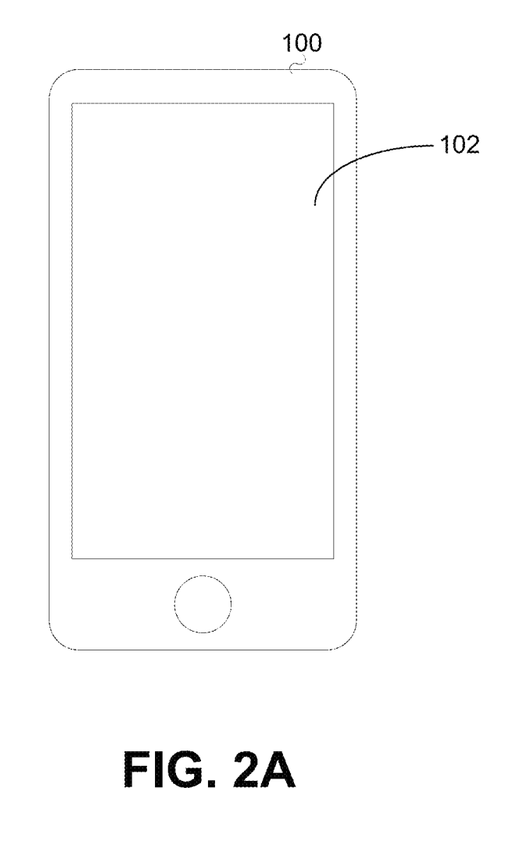
FIGS. 2A and 2B show the front and back of a mobile device, respectively.
Figure 2B:
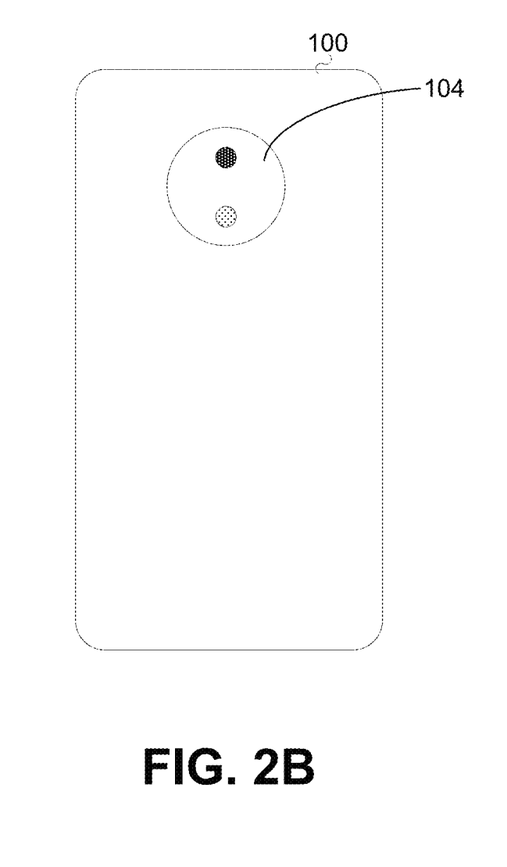

FIGS. 2A and 2B show the front and back of the mobile device 100, respectively.

Referring to FIG. 2A, the front of the mobile device 100 includes a display 102. The display 102 is a module of the mobile device 100. The display 102 is for presenting graphics. The display 102 may be, for example, a liquid crystal display (LCD). In addition to being an output device, the display 102 may also be an input device. For example, the display 102 may allow touch input to be provided to the mobile device 100. In other words, the display 102 may be a touch sensitive display module. In a particular example, the display 102 may be a capacitive touch screen.

Referring to FIG. 2B, the rear of the mobile device 100 includes a camera 104. The camera 104 is for capturing images of the environment of the mobile device 100. The camera 104 may, incorporate, a digital image sensor system as, for example, a charge coupled device (CCD) or a complementary metal-oxide-semiconductor (CMOS) image sensor.

Figure 3:
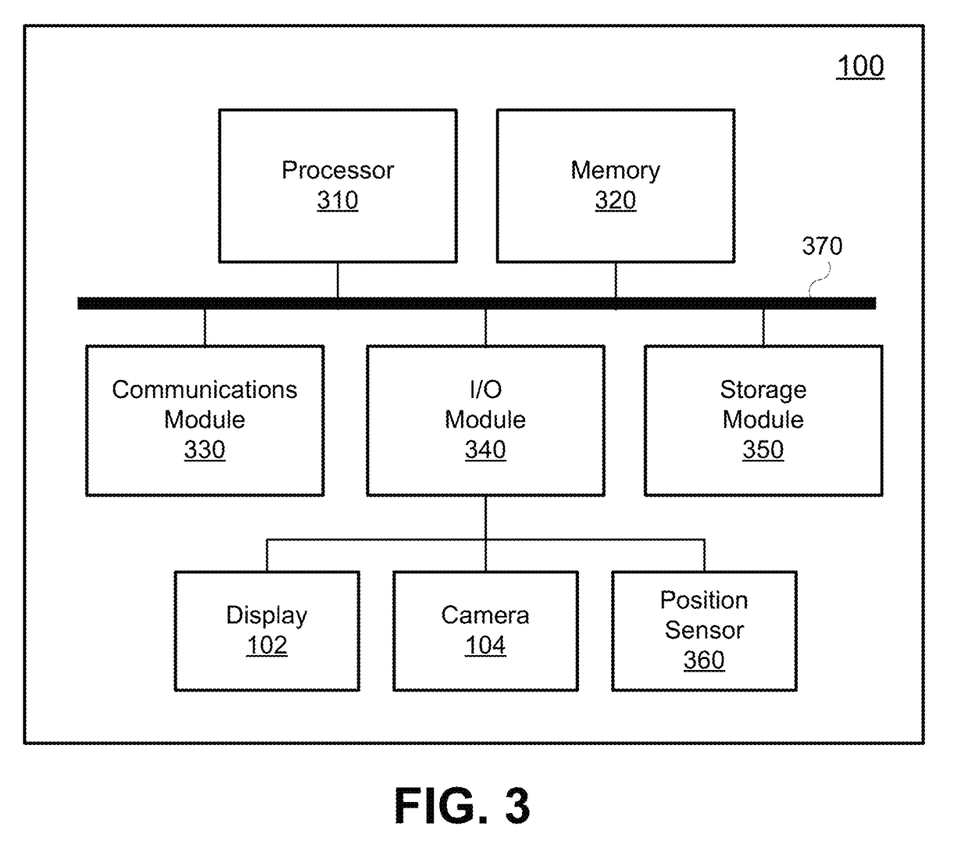
FIG. 3 is a high-level operation diagram of the mobile device of FIGS. 2A and 2B.

FIG. 3 is a high-level operation diagram of the mobile device 100.

The mobile device 100 includes a variety of modules. For example, as illustrated, the mobile device 100 may include a processor 310, a memory 320, a communications module 330, and/or a storage module 350. As illustrated, the foregoing example modules of the mobile device 100 are in communication over a bus 370.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the mobile device 100.

The communications module 330 allows the mobile device 100 to communicate with other computing devices and/or various communications networks. For example, the communications module 330 may allow the mobile device 100 to send or receive communications signals. Communications signals may be sent or received according to one or more protocols or according to one or more standards. For example, the communications module 330 may allow the mobile device 100 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the mobile device 100 to communicate using near-field communication (NFC), via Wi-Fi™, using Bluetooth™ or via some combination of one or more networks or protocols. In some embodiments, all or a portion of the communications module 330 may be integrated into a component of the mobile device 100. For example, the communications module may be integrated into a communications chipset.

The I/O module 340 is an input/output module. The I/O module 340 allows the mobile device 100 to receive input from and/or to provide input to components of the mobile device 100. For example, the I/O module 340 may, as shown, allow the mobile device 100 to receive input from and/or provide output to the display 102 and/or the camera 104. Additionally, the I/O module 340 may receive input from a position sensor 360. The position sensor 360 monitors the position of the mobile device 100 relative to the environment of the mobile device 100. For example, the position sensor 360 may be or may include one or more of an accelerometer, a digital compass, and/or the like.

The storage module 350 allows data to be stored and retrieved. In some embodiments, the storage module 350 may be formed as a part of the memory 320 and/or may be used to access all or a portion of the memory 320. Additionally or alternatively, the storage module 350 may be used to store and retrieve data from persisted storage other than the persisted storage (if any) accessible via the memory 320. In some embodiments, the storage module 350 may be used to store and retrieve data in a database. A database may be stored in persisted storage. Additionally or alternatively, the storage module 350 may access data stored remotely such as, for example, as may be accessed using a local area network (LAN), wide area network (WAN), personal area network (PAN), and/or a storage area network (SAN). In some embodiments, the storage module 350 may access data stored remotely using the communications module 330. In some embodiments, the storage module 350 may be omitted and its function may be performed by the memory 320 and/or by the processor 310 in concert with the communications module 330 such as, for example, if data is stored remotely.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
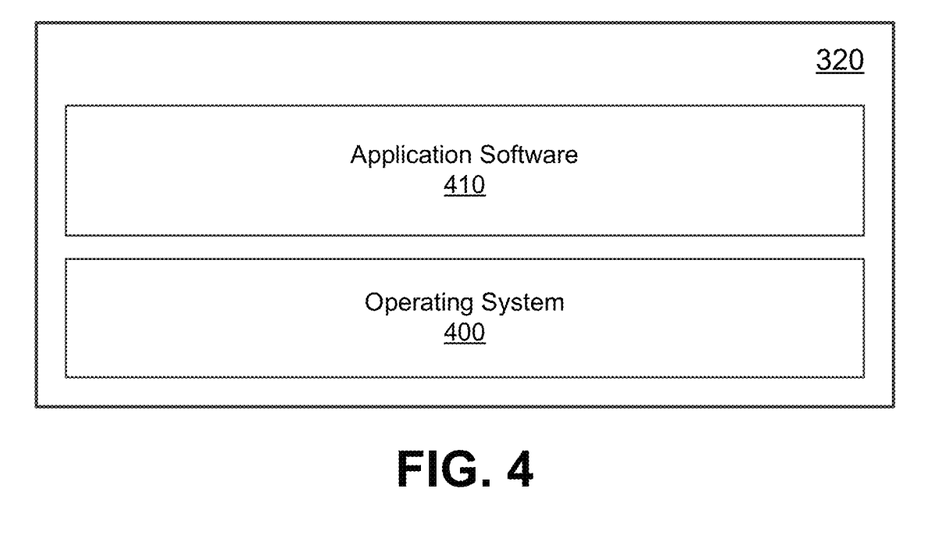
FIG. 4 shows a simplified organization of software components stored in a memory of the mobile device of FIGS. 2A and 2B.

FIG. 4 depicts a simplified organization of software components stored in the memory 320 of the mobile device 100. As illustrated, these software components include an operating system 400 and an application software 410.

The operating system 400 is software. The operating system 400 allows the application software 410 to access the processor 310 (FIG. 3), the memory 320, the communications module 330, the I/O module 340, and the storage module 350 of the mobile device 100. The operating system 400 may be, for example, Google™ Android™, Apple™ iOS™, UNIX™, Linux™, Microsoft™ Windows™, Apple OSX™ or the like.

The application software 410 adapts the mobile device 100, in combination with the operating system 400, to operate as a device allowing activation of a physical token requiring activation to be initiated in augmented reality.

As mentioned above, it may be that a physical token is not yet activated. For example, the physical token may require activation before first use. In order to use the mobile device 100 to initiate activation of an un-activated physical token, the un-activated physical token must be brought into an environment proximate to or the same as the mobile device.

Physical tokens requiring activation may take a variety of forms. Among other things, the physical token can be a payment card, hardware associated with a service needing activation, an advert, a document, etc. For example, a physical token may be an ISO-sized card such as, for example, a payment card like a credit or debit card. In another example, tokens may include other forms of payment cards, gym membership cards, insurance policy documentation or offer sheets, library cards, magazines (in which case the activation techniques could be used to subscribe), an electronic device having a subscription service associated therewith such as, for example, a satellite radio (e.g., SiriusXM™) or OnStar™. Notably services associated with an electronic device may activated using techniques in accordance with the subject matter of the present application with the physical token being the device providing the service (e.g., a vehicle in the case of OnStar), accompanying documentation or collateral, an advertisement, or the like.

Figure 5:
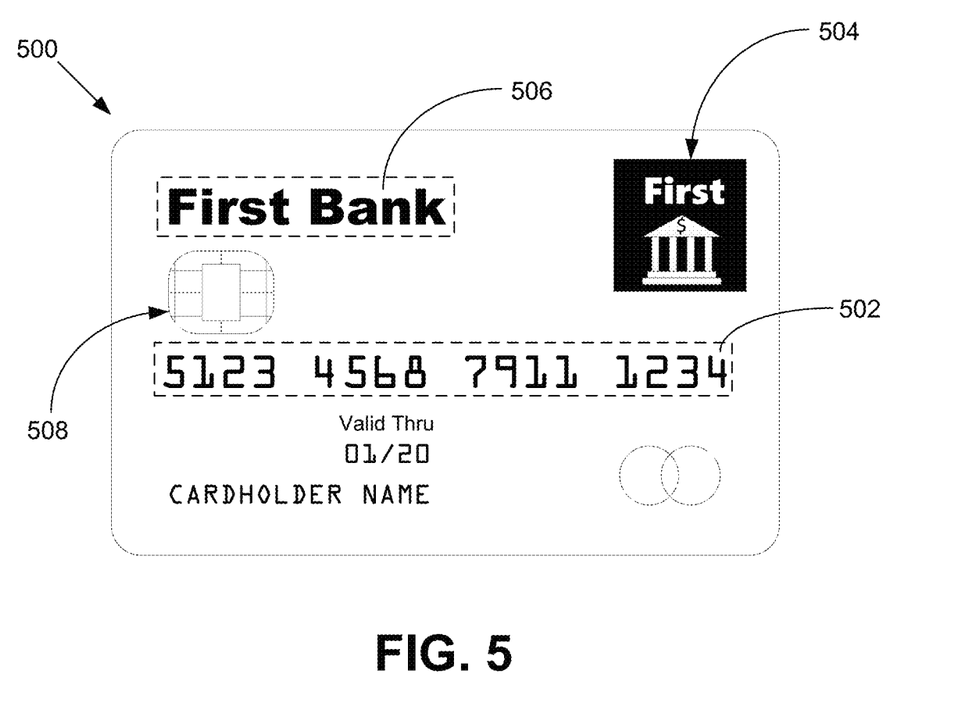
FIG. 5 shows an example physical token.

An example physical token such as may require activation is shown in FIG. 5. As illustrated, a payment card 500 is a physical token. The payment card 500 is a credit card. The payment card 500 may require activation such as, for example, before first use.

The payment card 500 may include a variety of elements. For example, the payment card 500 includes a credit card number 502. The payment card 500 also includes branding elements including a logo 504 and a label 506. As illustrated, the payment card 500 is a so-called "chip card" and includes an EMV (Europay-MasterCard-Visa) smart-chip 508.

Figure 6:
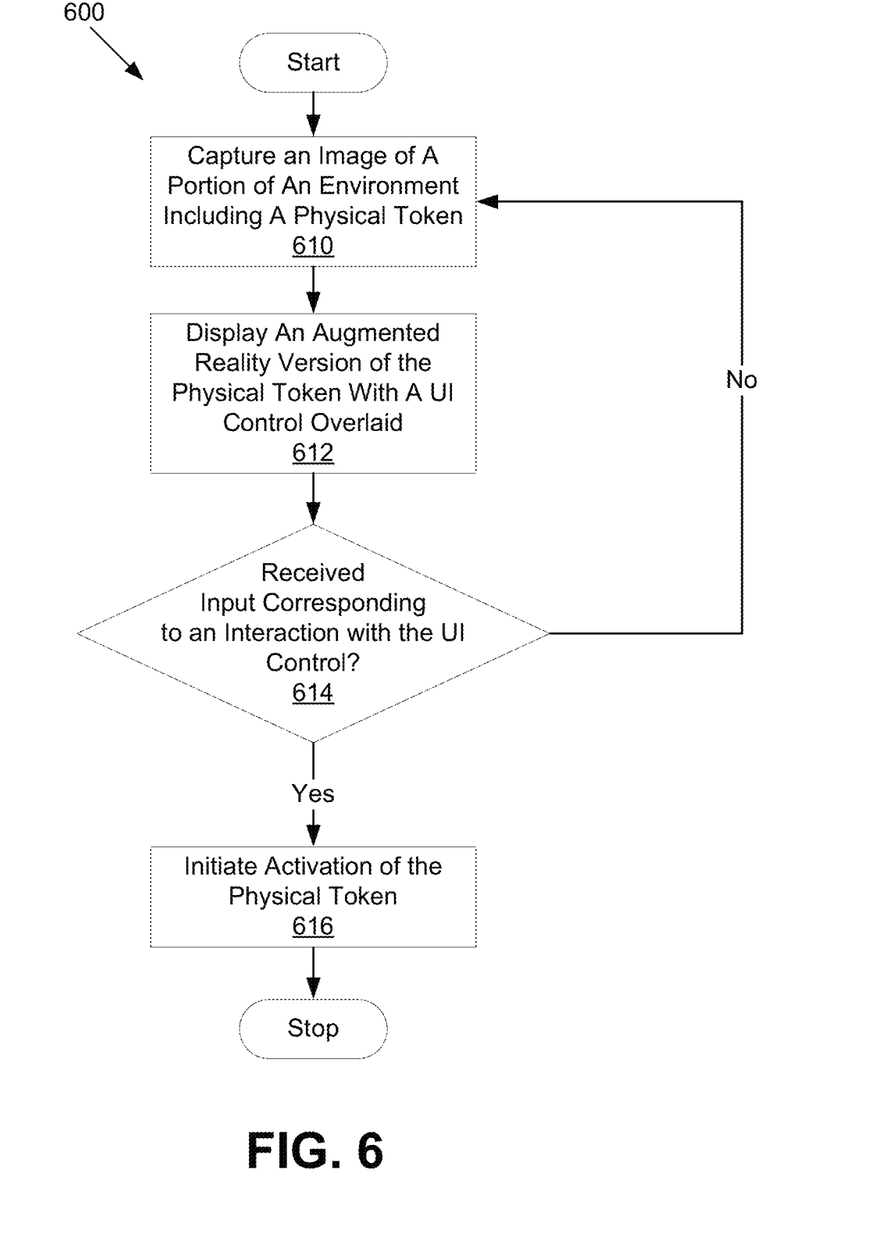
FIG. 6 is a flowchart showing operations performed by a mobile computing device in allowing initiation of activation of a physical token in augmented reality.

The operation of the mobile device 100 in allowing activation of a physical token requiring activation to be initiated in augmented reality will now be described with reference to a flowchart 600 of FIG. 6. Operations 610 and onward are performed by the processor 310 of the mobile device 100 executing software such as, for example, a suitable instance of the application software 410 (FIG. 4).

As further explained below, the mobile device 100 displays, using the display 102 of an environment that includes a physical token (e.g., the payment card 500) as may require activation before use. This displaying of an augmented reality version of the environment corresponds to operations including the operation 610 and an operation 612.

At the operation 610, the mobile device 100 captures an image of a portion of the environment including the physical token requiring activation. The image may be captured using the camera 104.

Following the operation 610, at the operation 612, an augmented reality version of the physical token is presented with a user interface control overlaid. The augmented reality version of the physical token may be presented by presenting a display of augmented reality corresponding to a portion of the environment, namely the portion of the environment captured at the operation 610. The display of the augmented reality may be presented by compositing the image of the portion of the environment captured at the operation 610 with a graphical, interactive user interface control. As further described below, interaction with the user interface control may act as a trigger for initiation of activation of the physical token.

The above-mentioned graphical user interface control is positioned in a defined position in augmented reality relative to the physical token. Such a defined position may be identified in a variety of manners. For example, it may be that in the image captured of the portion of the environment, one or more visual elements of the physical token (i.e., elements visible on the physical token when viewed) may be identified. For example, referring to FIG. 5, such elements may include one or more of the credit card number 502, the logo 504, the label 506, and/or the EMV smart-chip 508. Notably, by detecting positions of one or more such elements, the defined position in the image of the portion of the environment may be determined based on the positions of the identified one or more visual elements. For example, it may be that the user interface control is to be positioned in a pre-determined position above, below, besides, and/or between one or more of the identified visual elements such as, for example, at a particular distance relative to features of one or more such elements (e.g., the centres and/or edges thereof). As further explained below, the defined position may be selected to provide an intuitive entry point for initiating activation.

Examples of graphical, interactive user interface controls as may be overlaid in augmented reality will now be described.

Figure 7A:
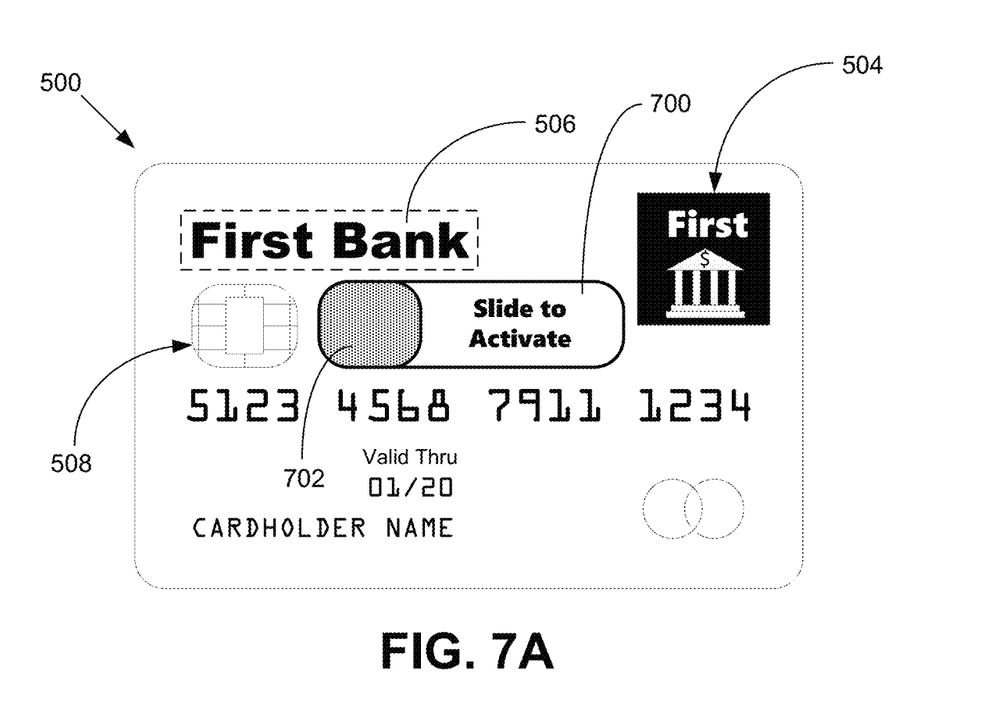
FIG. 7A provides an example of how the physical token of FIG. 5 may be presented in augmented reality.

FIG. 7A shows a first example of how the payment card 500 may be displayed in augmented reality. As illustrated, an example user interface control 700 has been overlaid atop the payment card 500. As mentioned above, such an overlay may be displayed, for example, by compositing an image of the example user interface control 700 with an image of a portion of an environment showing the payment card 500.

The example user interface control 700 includes a slider 702. As further described below, interaction with the example user interface control 700 may include providing input sliding the slider 702 across the face of the example user interface control 700. The example user interface control 700 may be considered to provide "slide to activate" semantics similar to "slide to unlock" semantics of some mobile devices. Conveniently, a user may find this to be a particularly intuitive analogy for activation, with activation corresponding to "unlocking" the functionality accessed using the physical token. Moreover, the location of such an "unlock control" on the payment card 500 (as presented in augmented reality) may provide a particularly intuitive entry point for initiating activation.

Figure 7B:
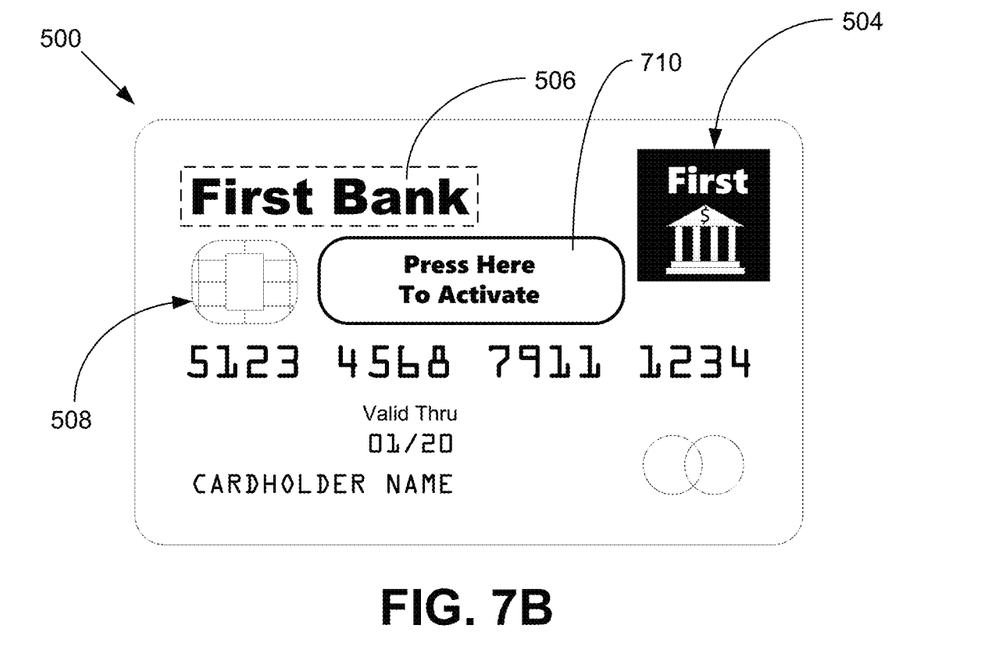
FIG. 7B provides another example of how the physical token of FIG. 5 may be presented in augmented reality.

FIG. 7B shows a second example of how the payment card 500 may be displayed in augmented reality. As illustrated, a second example user interface control 710 has been overlaid atop the payment card 500. The second example user interface control 710 may be displayed using techniques or manners similar to the example user interface control 700. The second example user interface control 710 may be considered a button. As further described below, interaction with the second example user interface control 710 may include providing input corresponding to touching or pressing the second example user interface control 710.

Of course, the above are examples and other varieties of user interface controls may be employed.

As mentioned above, the user interface control may be positioned in augmented reality in a variety of fashions and, more particularly, may be positioned in a position defined relative to features of the physical token.

Figure 8A:
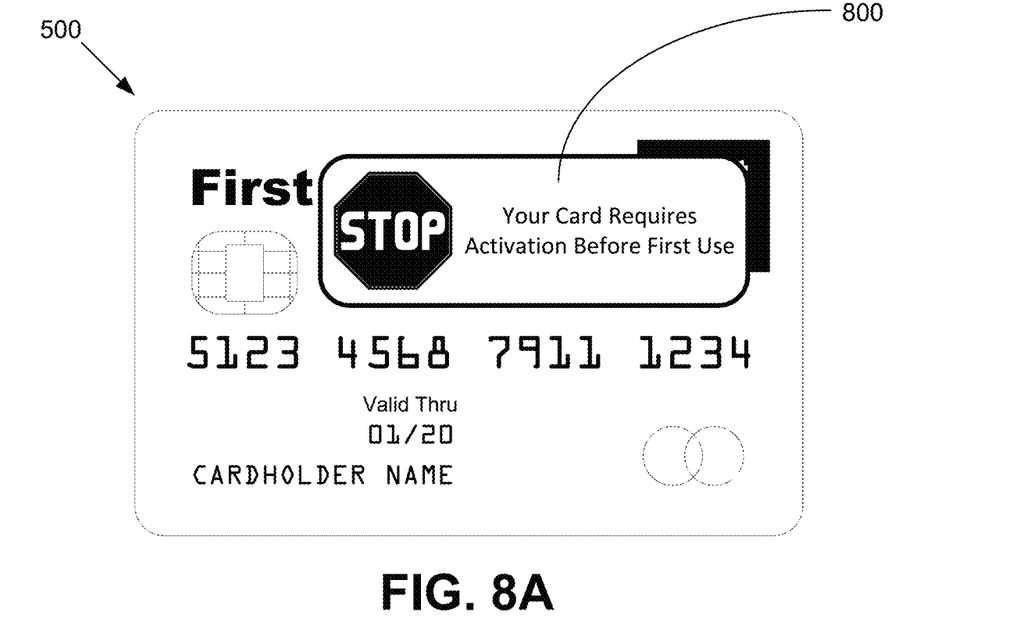
FIG. 8A shows how the physical token of FIG. 5 may be provided with a sticker indicating the need for activation.
Figure 8B:
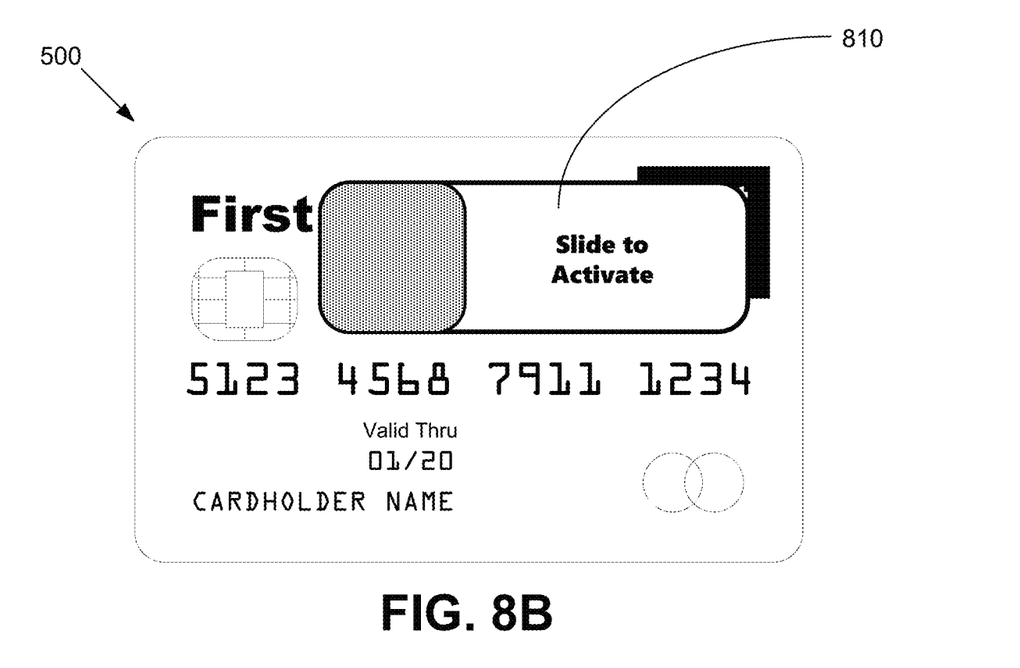
FIG. 8B shows how the physical token of FIG. 8A (e.g., the physical token of FIG. 5 with a sticker) may be presented in augmented reality.

In another example of how a user interface control may be positioned in augmented reality it may be that, in some cases, an un-activated physical token may include a temporary visual element such as, for example, a removable sticker or removable label. Such a temporary element may include information or instructions relating to the need for activation. For example, as shown in FIG. 8A, a payment card may be provided with a removable sticker 800 attached to its face indicating the need to activate the payment card 500 prior to using it. The removable sticker 800 may serve as a visual element employed in determining the defined position in which a user interface control will be positioned in augmented reality. For example, a user interface control may be positioned atop the removable sticker 800 so as to partially or completely replace it in augmented reality. A particular example of how the removable sticker 800 may be replaced by a graphical, interactive user interface control is shown in FIG. 8B. As illustrated in FIG. 8B, the removable sticker may be replaced in augmented reality by a slider control 810.

Referring again to FIG. 6, following the display of an augmented reality version of the physical token with an overlay of a user interface control at the operation 612, an operation 614 is next.

At the operation 614, it is determined whether input corresponding to an interaction with the user interface control displayed at the operation 612 has been received.

Input corresponding to an interaction with the user interface control may take a variety of forms.

For example, it may be, as mentioned above, that the display 102 is a touch screen display. Input corresponding to an interaction with the user interface control may be touch input such as may be received via the display 102. In other words, receiving input corresponding to an interaction with the user interface control may include receiving touch input corresponding to an interface with the user interface control as presented at the operation 612.

Examples of touch interactions with the display 102 as may be considered interaction with a user interface control will now be discussed.

First, referring, for example, to FIG. 7A, a user may touch the display of the example user interface control 700 in such a touch interaction. More particularly, a user may touch the display 102 proximate to or on the slider 702 and may drag the slider 702 from its starting position towards the right of the example user interface control 700. Notably, during such an interaction the slider 702 may be animated to follow a path corresponding to a path of the touch input so as to appear to slide across the face of the example user interface control 700. Such a touch interaction with the display 102 may cause an interaction with the example user interface control 700 to be detected such as, for example, when the animated slider 702 reaches the right-hand side of the example user interface control 700.

In another example, referring to FIG. 7B, a user may touch the display 102 within the area defined by the second example user interface control 710 in a manner akin to pressing a button. Such a touch and release touch interaction with the display 102 may be considered an interaction with the second example user interface control 710.

In another example of input corresponding to an interaction with the displayed interactive user interface control, it may be that user interaction with the physical token is monitored based on captured images of the environment including the physical token. For example, images of portions of the environment may be captured using the camera 104 akin to the capturing of the image at the operation where the physical token is the payment card 500. In any event, using captured images of the portions of the environment, a user's hand (and in particular fingers) moving in or about the payment card 500 may be detected and, more particularly, in areas of the environment corresponding to areas in augmented reality as are on or about the user interface control. In this way, touching or hovering of a user's fingers (so as to effectively interact in augmented reality with the user interface control) may be detected and treated as a form of input. More particularly, based on captured images of portions of the environment, an interaction with the environment at a location corresponding to the position of the user interface control in augmented reality (i.e., the above-mentioned defined position) may be detected.

Such input may then be processed in manners similar to touch input. For example, referring to the FIG. 7A, a user may move their fingers to a position in the environment corresponding to a position as may be atop or proximate the slider 702 in the example user interface control 700 in augmented reality. The user may then slide or hover their fingers across the face of the payment card 500 to a position in the environment corresponding to a position at or about the right of the example user interface control 700 in augmented reality. In this way, the user may, in effect, swipe the example user interface control 700 in augmented reality. Notably, such an interaction may be considered an augmented reality interaction akin to the touch interaction with the example user interface control 700 described above. In another example, referring to FIG. 7B, a user may move their hand to a position in the environment corresponding to a position at or about the second example user interface control 710 in augmented reality. In this way, the user may, in effective, touch or tap the second example user interface control 710 in augmented reality.

In some embodiments, detected fingers may, at the operation 612, be rendered atop the user interface control. In other words, during composition of an image of the user interface control with an image of the portion of the environment including the physical token, the user interface control image may be overlaid atop the image of the portion of the environment in the defined position except that portions of the user interface control image as may occlude fingers of a user in the image of the portion of the environment may not be included in the composited image, thereby allowing the fingers to remain visible in the resultant composited image.

If it is detected at the operation 614 that input corresponding to an interaction with the user interface control displayed at the operation 612 has been received, an operation 616 is next. Otherwise, control may, as shown in the flowchart 600, return to the operation 610 so that a further image of a portion of the environment may be captured. Notably, by capturing and re-rendering the augmented reality environment over time, the display of the augmented reality version of the environment may be updated to correspond to movement and/or repositioning of the mobile device 100 in the environment. More particularly, such capturing and rendering should be performed in real-time or near-real-time in order to provide an immersive augmented reality experience.

At the operation 616, activation of the physical token is initiated responsive to the receipt of input corresponding to an interaction with the user interface control as was detected at the operation 614.

Initiating activation of a physical token may involve communication with the server computing device 110. For example, the mobile device 100 may communicate with the server computing device 110 via the network 120 such as, for example, using the communications module 330.

The mobile device 100 may send the server computing device 110 an indication identifying the physical token requiring activation. For example, the mobile device 100 may extract (such as from the image captured at the operation 610) a value visible on the physical token that identifies the physical token. In a particular example, in the case of the payment card, an image or the values of the credit card number 502 may be extracted from an image and provided to the server computing device 110. For example, optical character recognition (OCR) techniques may be applied to the image or the portion of the image corresponding to the credit card number 502 in order to extract the value of the credit card number 502. Next, an indication, effectively a request to activate the physical token, may be sent to the server computing device 110. For example, such a request may be sent to such a server computing device via a network. The request may include an indication of the extracted value identifying the physical token (e.g., the credit card number 502 of the payment card 500). The server computing device 110 may then use that value to initiate activation and, potentially, to complete activation of the physical token (e.g., activation of the payment card 500). Activation, generally speaking, includes the initiation or making available of a product and/or service associated with the physical token. For example, activation may include making the physical token (e.g., the payment card 500) available for use in association with a particular product and/or service. In another example, initiation of a service may include enrollment in starting of a subscription related to the physical token such as, for example, a magazine subscription where the physical token is, for example, a magazine. In another example of enrollment in a subscription, where the physical token is a product such as, for example, a household product like laundry detergent, activation may entail enrolling in a service providing a recurring delivery and/or purchase of that product.

As mentioned above, it may be that, in some embodiments, in addition to initiating activation of the physical token at the operation 616, activation of the physical token is completed at the operation 616. Alternatively, activation may be made by way of a separate application and initiating activation may consist of launching that application. Such an application may then authenticate the user prior to or as a part of activation. For example, where the physical token is a payment card, an online banking application may be launched and activation may include authenticating a user using their online banking credential or in some other manner such as, for example, by way of a series of security questions.

It may be that, in order to determine whether to activate and/or to initiate the physical token, the server computing device 110 may perform one or more checks.

For example, it may be that, prior to initiating activation of the physical token through the server computing device 110, the mobile device 100 authenticates with the server computing device 110. For example, the mobile device 100 may receive input corresponding to authentication information. The authentication information may, for example, be authentication information for an account associated with the physical token being activated. For example, the authentication information may be authentication for an account of a user who owns or who has been assigned the physical token. In a particular example, where the physical token is a payment card, the authentication information may correspond to online or mobile banking credentials. The mobile device 100 may use the authentication information to authenticate with the server computing device 110. In other words, the mobile device 100 may authenticate with the server computing device 110 based on the input. For example, the mobile device 100 may send the input or a value based on the input to the server computing device 110. Such authentication may occur prior to displaying the augmented reality experience or, alternatively, may occur before or as a part of initiating activation of the physical token.

In some embodiments, authentication may be based on a property of the mobile device 100, potentially corresponding to the mobile device 100 being known as a trusted device associated with the physical token or with an account with which the physical token is associated. For example, where the mobile device 100 is a smartphone, it may have an associated telephone number (e.g., a mobile subscriber international subscriber directory number (MSISDN)). Such values may be available via one or more application programming interfaces (APIs) such as, may, for example, be provided by the operating system 400. Additionally or alternatively, values may be extracted from hardware components such as, for example, from the subscriber identification module (SIM) of some mobile devices.

Such a value associated with the mobile device 100 may be extracted therefrom and sent to the server computing device 110 as a part of authentication and/or activation. For example, it may be that the request to initiate activation mentioned above may include an indication of such a value associated with the mobile device 100. Activation of the physical token may then include determining (such as by the server computing device 110) that such a value matches a value associated with an account corresponding to the physical token. For example, where the value is a telephone number, it may be determined that the phone number associated with the mobile device is a contact telephone number associated with the account. Other values may, additionally or alternatively, be verified. For example, other values may be extracted from the device such as, for example, the device International Mobile Equipment Identity (IMEI) number, or values from the SIM as mentioned above, may be verified such, as for example, by comparing them to values previously extracted from devices associated with the account. In a particular example, such values may have been previously collected and maintained such as, for example, during enrollment for mobile banking.

In some cases, extraction of the telephone number associated with a mobile device 100 may not be possible or the value may be untrusted. For example, it may be that a user can tamper with the value. The telephone number associated with the mobile device 100 may be verified by sending a communication to the mobile device 100 using the telephone number. For example, an SMS may be sent to the mobile device 100 (such as, for example, by the server computing device 110) using the purported telephone number of the mobile device 100 and/or a telephone call may be placed to that same number. The communication may include an authentication code that may then be communicated such as, for example, to the server computing device 110, in order to prove that the communication was received at the purported telephone number. For example, the authentication code may be included in a request to activate to the physical token. The authentication code may take a variety of forms. For example, where the communication is an SMS, the authentication code may be an alphanumeric or numeric code included in the payload of the SMS. Similarly, where the communication is a telephone call, the authentication code may be a word or series of characters spoken in the call (e.g., using text-to-speech).

Other manners of authentication may, additionally or alternatively, be employed. For example, a user may be presented with a series of security questions that they must answer in order to authenticate. Such questions and the responses thereto may, for example, be provided by the server computing device 110 to the mobile device 100 and vice-versa, respectively. In other cases, some authentication may be performed up-front (e.g., prior to presenting the augmented reality experience) while other authentication may be performed as a part of authentication or when initiating authentication. For example, values associated with the mobile device may be verified prior to presenting the augmented reality experience (to ensure the mobile device is one associated with the physical token) while security questions or a password may be employed as a part of or as a pre-requisite to activation in order to authenticate the user of the device. In this way, two-factor authentication may be provided.

In some embodiments, authentication methods may be combined. For example, various of the above examples of authentication methods may be used in combination.

In some embodiments, it may be determined whether the physical token is activated such as, for example, prior to presenting a display of augmented reality corresponding to a portion of the environment. Determination of whether a physical token is activated may take a variety of forms.

In a first example of determining whether a physical token is activated, it may be that after an initial image of a portion of the environment including the physical token is captured, a value, visible on the physical token, that identifies the token, is extracted from the image. For example, where the physical token is the payment card 500, the credit card number 502 (FIG. 5) may be extracted therefrom such as, for example, in manners described above. In any event, such an identifying value may be sent to a remote computing device such as, for example, the server computing device 110, in order to receive a response identifying whether or not the physical token has been activated.

In a second example of determining whether a physical token has been activated, where a removable visual element is provided on the physical token, users may be instructed to remove the visual element after activation. For example, in the case of FIG. 8A, a user may be instructed to remove the removable sticker 800 after activation. Accordingly, an initial image as mentioned above may be inspected to determined whether such a removable visual element has been removed. Then, an augmented reality experience may be provided if the removable visual element is still present. Notably, unless this is combined with another check (such as, for example, the online check of the first example), this may allow a forgetful or non-compliant user to start the augmented reality activation experience unnecessarily, however this may be detected and handled later such as, for example, after the user attempts to initiate activation (e.g., by providing an error stating that the physical token is already activated). Alternatively, as mentioned, detection of the removable visual element may be combined with other checks. For example, detection of the removable visual element may be a trigger for a further online check which must also be passed (i.e., by way of a finding that the physical token is not yet activated) in order to proceed with the augmented reality experience.

In some embodiments, an augmented reality experience may still be provided if it is determined that the physical token is already activated. For example, it could be that, rather than providing an interactive, user interface control allowing initiation of activation, a message or indication is provided in augmented reality identifying that the physical token is already activated. For example, such a message or indication may be provided in augmented reality in the above-mentioned defined position in place of the user interface control.

The mobile device 100 is an example of a computing device as may be employed in providing an implementation of the subject matter of the present application. Other computing devices may also potentially be employed.

Figure 9A:
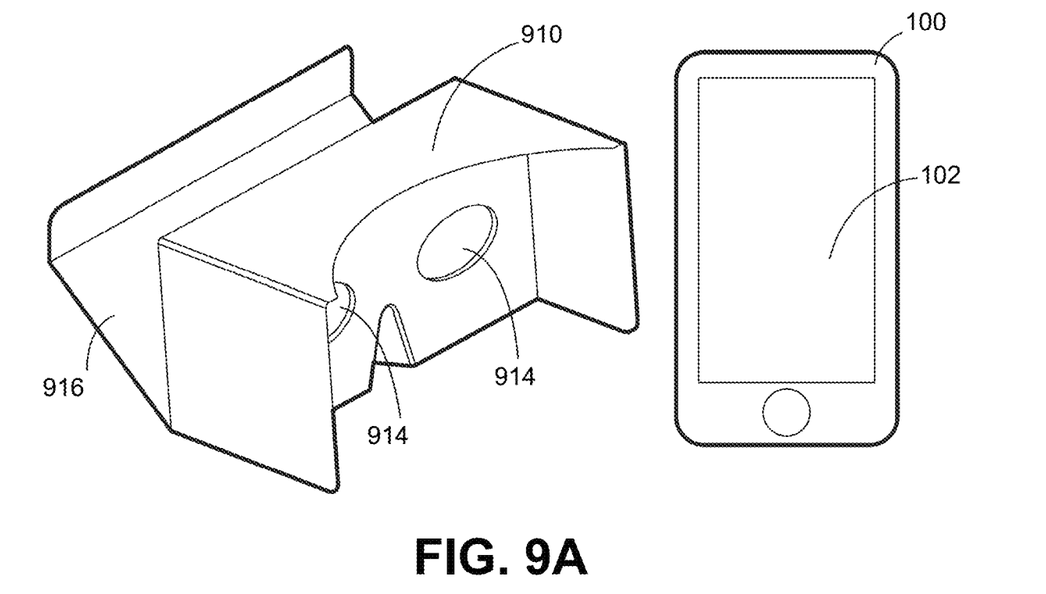
FIGS. 9A and 9B show a wearable augmented reality device in partially assembled and assembled states, respectively.
Figure 9B:
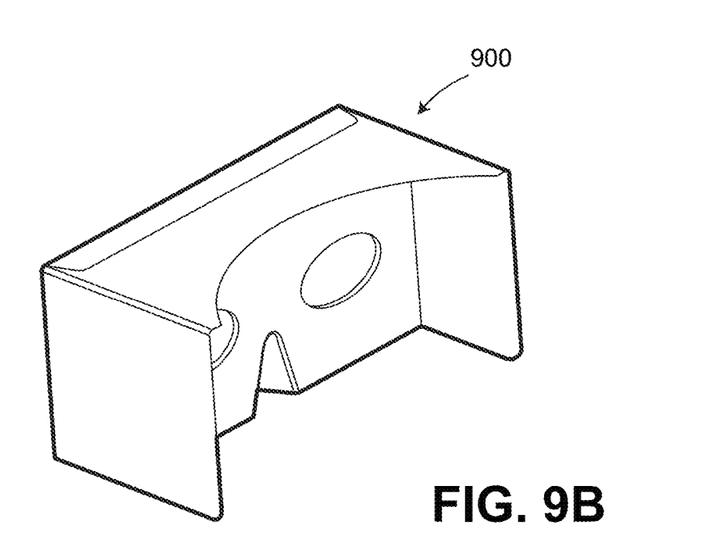

For example, another example computing device may be provided by combining the mobile device 100 with other components. Such an example device will now be described with reference to FIGS. 10A and 10B.

As best shown in FIG. 9A, an augmented reality device 900 may be formed using a kit consisting of a frame 910 and the mobile device 100. The mobile device 100 may be inserted into a compartment or cavity with a display 102 of the mobile device 100 facing towards a pair of viewports 914. A rear door 916 of the frame 910 may then be closed as shown in FIG. 9B. As such, the augmented reality device 900, when assembled, includes a virtual-reality headset frame (the frame 910) and the mobile device 100 which is mounted in the frame 910. Notably, the augmented reality device 900 may be worn or donned such as, for example, by holding it up to or mounting it against the face of a user. As such, the augmented reality device 900 may be considered a wearable augmented reality device.

The frame 910 may be made of a variety of materials such as, for example, cardboard or a suitable plastic such as, for example, ethylene-vinyl acetate (EVA). Further, it may be that plastic or glass lenses are provided at the viewports 914. In a particular example, the frame 910 may be a Google™ Cardboard frame or similar.

A viewer may look through the viewports 914 with their eyes to the display 102. The lenses in the viewport may, for example, assist the viewer in focusing on the display. The pair of viewports 914 may provide stereo separation of a viewer's eyes and may, therefore, allow a user to view the augmented reality environment in three-dimensions.

Notably, where the augmented reality device 900 is worn on the head of a user, the position sensor 360 of the mobile device 100 may register movement of the user's head. For example, the user could wear the augmented reality device 900 (FIGS. 9A, 9B) by pressing it against their face and holding it in place with their hands as they look through it and have movements of their head registered by the position sensor 360.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computing device comprising:
a processor;
a display module coupled to the processor;
a memory module coupled to the processor and storing instructions that, when executed by the processor, cause the computing device to:
display, using the display module, an interactive user interface control in augmented reality in a defined position relative to an un-activated physical token and for initiation of activation of the un-activated physical token; and
responsive to receipt of input corresponding to an interaction with the interactive user interface control displayed in the defined position relative to the un-activated physical token, initiate activation of the un-activated physical token to make the physical token available for use in electronic payments.

2. The computing device of claim 1, wherein receiving input corresponding to the interaction with the interactive user interface control includes detecting, using an image capture module, an interaction with the environment of the computing device, the defined position in augmented reality corresponding to a location of the interaction in the environment.

3. The computing device of claim 1, wherein the display module is a touch sensitive display module and wherein receiving input corresponding to the interaction with the interactive user interface control includes receiving touch input, via the display module, corresponding to an interaction with the interactive user interface control as displayed.

4. The computing device of claim 1, wherein the computing device further includes an image capture module and the instructions, when executed by the processor, further cause the computing device to:
  capture, using the image capture module, an image of the physical token; and
  identify, in the image, one or more visual elements of the physical token, wherein the defined position is determined based on positions of the one or more visual elements.

5. The computing device of claim 4, wherein the one or more visual elements of the un-activated physical token include a logo displayed on the physical token.

6. The computing device of claim 4, wherein at least one of the one or more visual elements corresponds to a removable sticker applied to the physical token.

7. The computing device of claim 1, wherein the computing device further comprises a communications module coupled to the processor and wherein initiating the activation of the physical token includes:
  extracting a value, visible on the physical token, identifying the physical token from an image of the physical token; and
  sending, to a server computing device via a network using the communications module, a request to activate the physical token, the request including an indication of the value identifying the physical token.

8. The computing device of claim 7, wherein the request further includes an indication of a value associated with the computing device and wherein the activation of the physical token includes determining that the value associated with the computing device matches a value associated with an account corresponding to the physical token.

9. The computing device of claim 8, wherein the value associated with the computing device includes a telephone number and wherein the instructions, when executed by the processor, further cause the computing device to:
  receive a short message service (SMS) communication that was sent to the telephone number, the SMS communication including an authentication code, wherein the request to activate the physical token includes an indication of the authentication code.

10. The computing device of claim 7, wherein the instructions, when executed by the processor, further cause the computing device to:
  receive input corresponding to authentication information; and
  authenticate with the server computing device based on the input.

11. The computing device of claim 1, wherein the instructions, when executed by the processor, further cause the computing device to:
  determine, prior to displaying the user interface element, that the physical token is not activated.

12. A computer-implemented method comprising:
  displaying an interactive user interface control in augmented reality in a defined position relative to an un-activated physical token and for initiation of activation of the un-activated physical token; and
  responsive to receipt of input corresponding to an interaction with the interactive user interface control displayed in the defined position relative to the un-activated physical token, initiating activation of the un-activated physical token to make the physical token available for use in electronic payments.

13. The computer-implemented method of claim 12, wherein receiving input corresponding to the interaction with the interactive user interface control includes detecting based on one or more captured images of portions of the environment of the computing device, an interaction with the environment wherein the defined position in augmented reality corresponds to a location of the interaction in the environment.

14. The computer-implemented method of claim 12, wherein receiving input corresponding to the interaction with the interactive user interface control includes receiving touch input corresponding to an interaction with the interactive user interface control as displayed.

15. The computer-implemented method of claim 12, further comprising:
  identifying, in an image of the physical token, one or more visual elements of the physical token, wherein the defined position is determined based on positions of the one or more visual elements.

16. The computer-implemented method of claim 12, wherein the initiating activation of the physical token includes:
  extracting a value, visible on the physical token, identifying the physical token from the image of the physical token; and
  sending, to a server computing device via a network, a request to activate the physical token, the request including an indication of the value identifying the physical token.

17. The computer-implemented method of claim 12, further comprising:
  determining, prior to displaying the user interface element, that the physical token is not activated.

18. The computer-implemented method of claim 12, wherein the physical token includes a payment card.

19. A non-transitory computer-readable storage medium storing instructions that, when executed by a processor of a computing device, cause the computing device to:
  display an interactive user interface control in augmented reality in a defined position relative to an un-activated physical token and for initiation of activation of the un-activated physical token; and
  responsive to receipt of input corresponding to an interaction with the interactive user interface control displayed in the defined position relative to the un-activated physical token, initiate activation of the un-activated physical token to make the physical token available for use in electronic payments.

20. The computing device of claim 1, wherein the computing device further includes an image capture module and the instructions, when executed by the processor, further cause the computing device to capture, using the image capture module, an image including the un-activated physical token to be used to display the un-activated physical token in augmented reality.

* * * * *